United States Patent [19]

Carlson et al.

[11] 4,183,009
[45] Jan. 8, 1980

[54] LOW FREQUENCY DETECTION SYSTEM

[75] Inventors: Paul F. Carlson, Portland, Oreg.;
Gordon L. Mitchell, Seattle, Wash.

[73] Assignee: The United States of America as represented by the Secretary of the Navy, Washington, D.C.

[21] Appl. No.: 872,415

[22] Filed: Jan. 26, 1978

[51] Int. Cl.² .................................................. H04B 11/00
[52] U.S. Cl. ..................................... 367/117; 181/401; 181/402; 367/120
[58] Field of Search ....................... 181/400, 401, 402; 340/5 R, 6 R

[56] References Cited

U.S. PATENT DOCUMENTS

| | | | |
|---|---|---|---|
| 2,653,220 | 9/1953 | Bays | 325/28 |
| 2,838,741 | 6/1958 | Mason | 340/6 R X |
| 3,803,616 | 4/1974 | Kopf et al. | 343/719 |
| 3,811,106 | 5/1974 | Tyrrel | 340/5 R |
| 3,922,635 | 11/1975 | Colvin et al. | 340/6 R |
| 4,114,135 | 9/1978 | Funk | 340/6 R X |

OTHER PUBLICATIONS

Axelrod et al., *J. of the Acoustical Society of America*, vol. 37, No. 1, Jan. 1965, pp. 77–83.

*Primary Examiner*—Richard A. Farley
*Attorney, Agent, or Firm*—R. S. Sciascia; Charles D. B. Curry

[57] ABSTRACT

A low frequency detection system including the use of the sloping characteristics of the underwater near shore, the tapered section of ocean above the near shore, and an acoustic array. The acoustic array comprises a plurality of detectors that extend into the earth and are near the shore and tapered media. Low frequency sound energy in the range of from about 1 to about 100 Hz is coupled into the earth at discrete positions along the interface between the ocean and the sloping underwater shore. The maximum energy density for each frequency occurs at different ocean depths and the acoustic detectors are positioned to receive the optimum earth radiated beam at selected frequencies. The system involves locating tuned elements of an array in different arrangements and using a plurality of arrays and moving or stationary sound sources for active target detection and underwater earth mapping.

8 Claims, 11 Drawing Figures

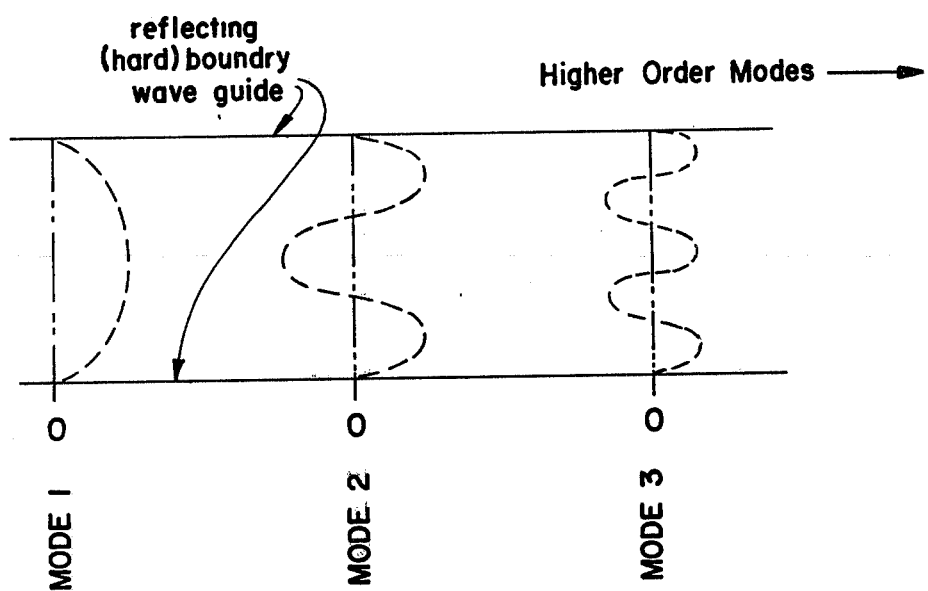
FIG _ 1
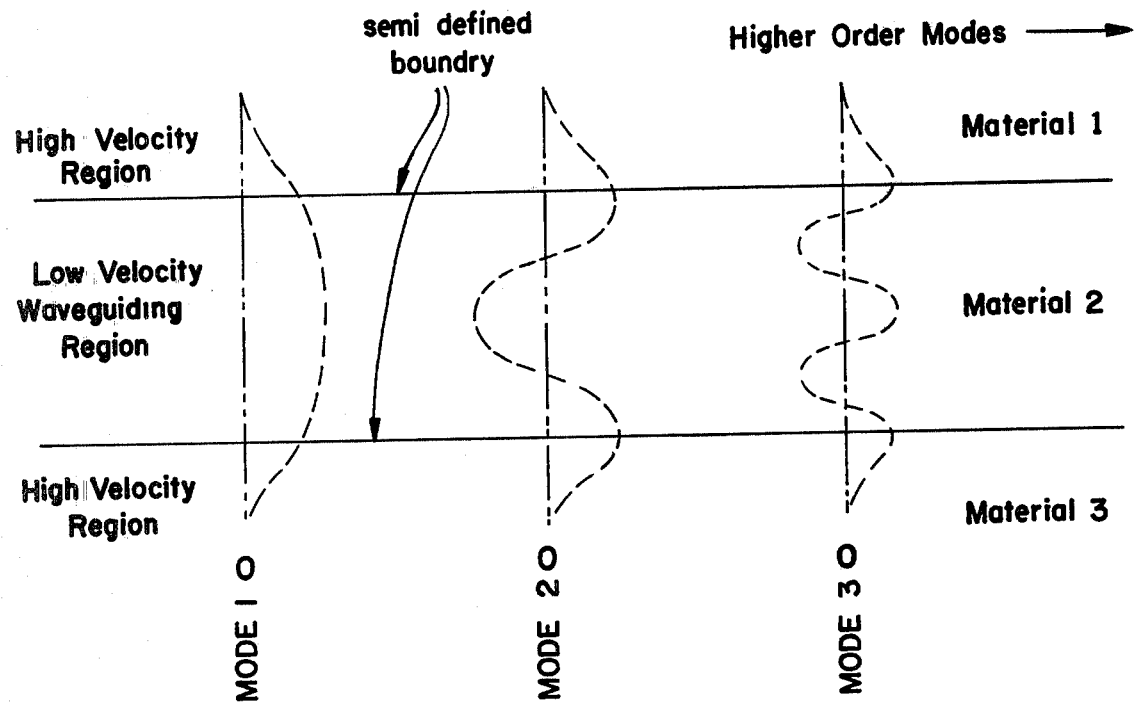
FIG _ 2

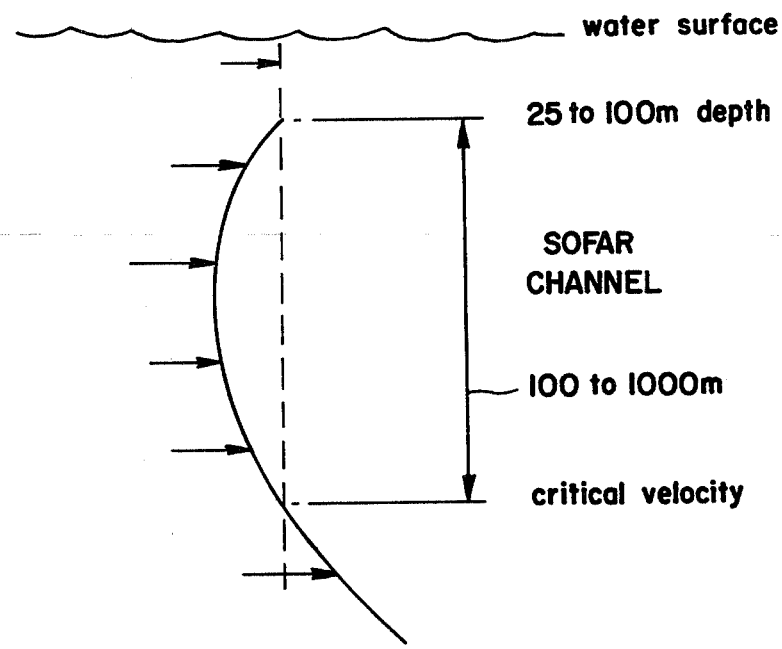
FIG_3
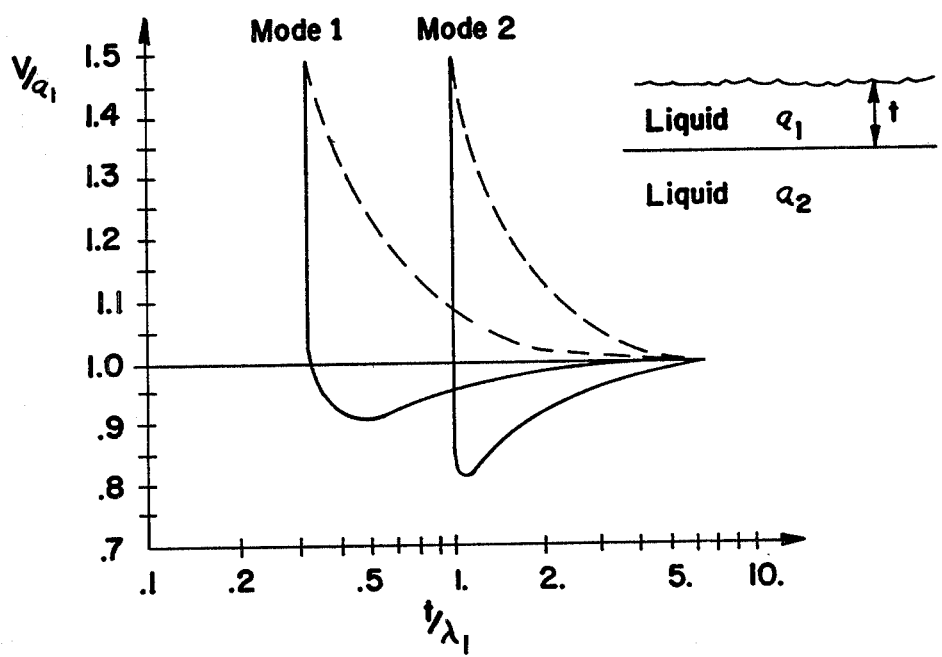
FIG_4

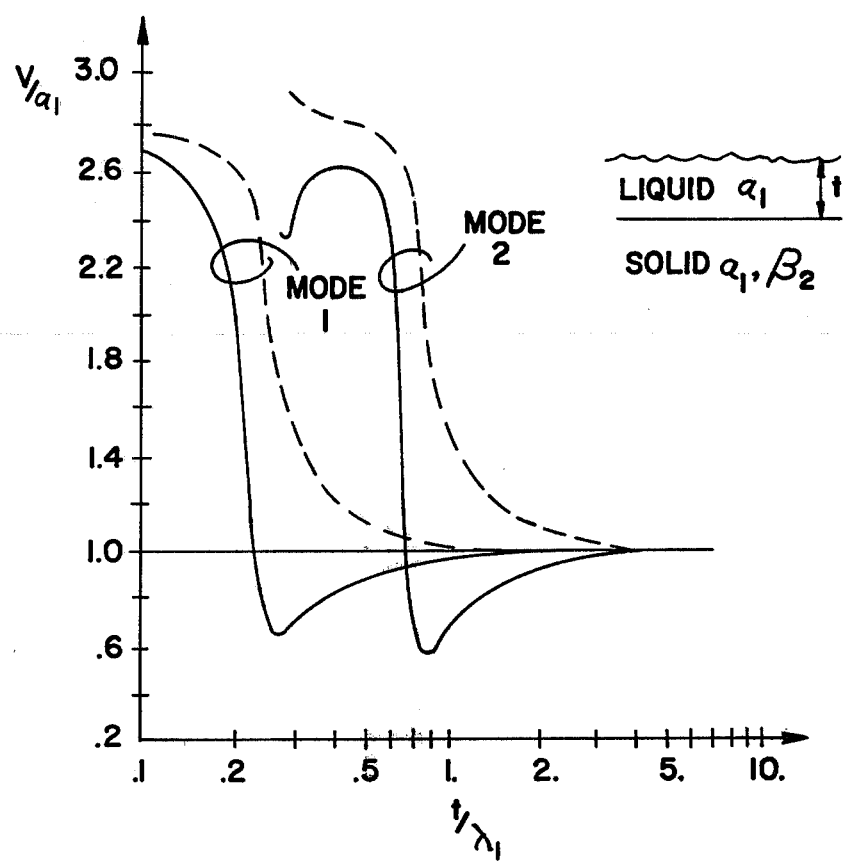
FIG_5
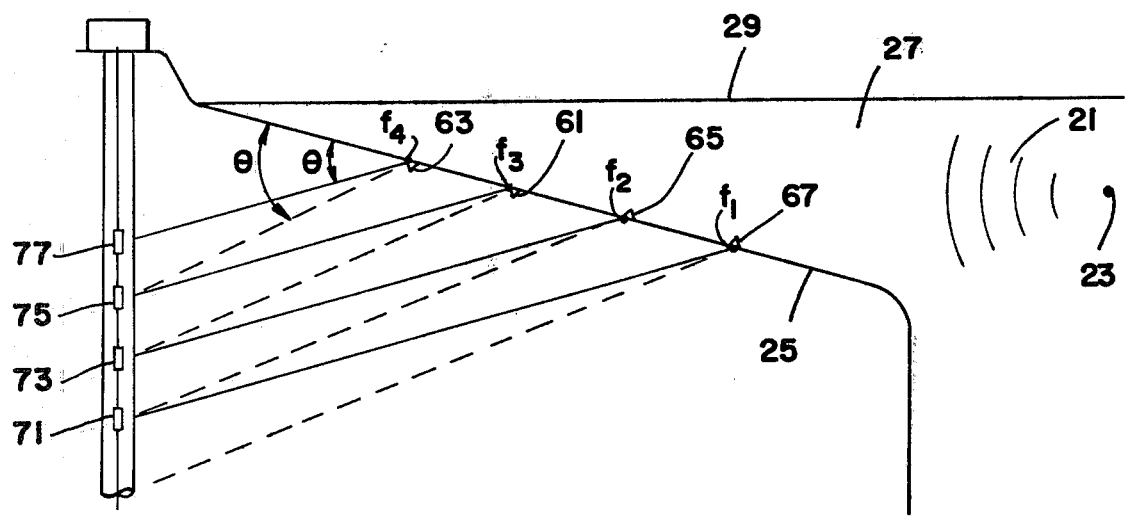
FIG_9

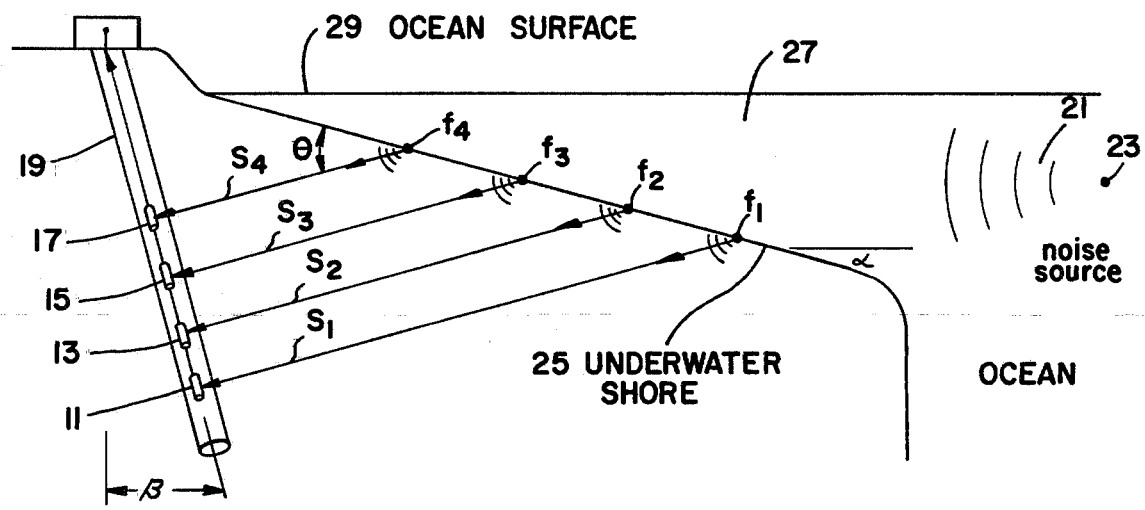
FIG_6
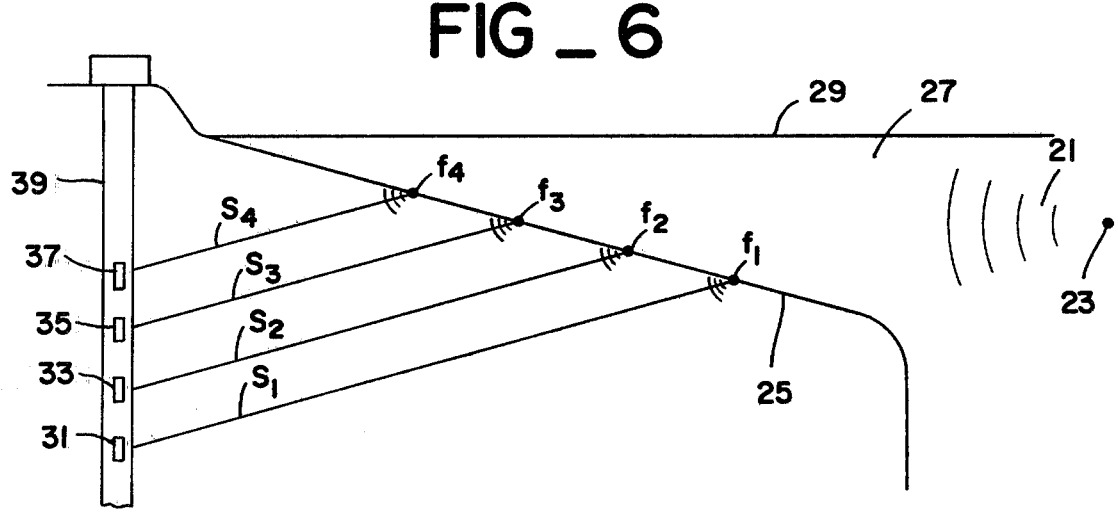
FIG_7
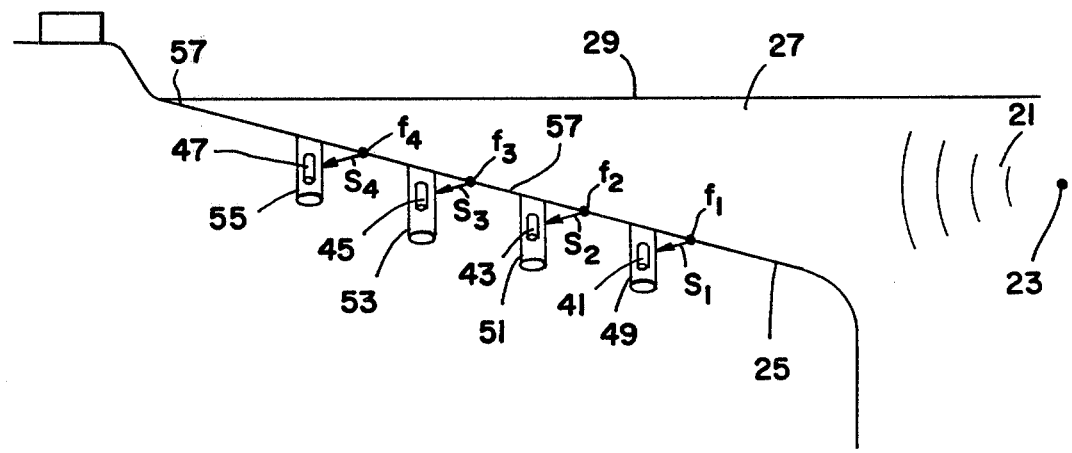
FIG_8

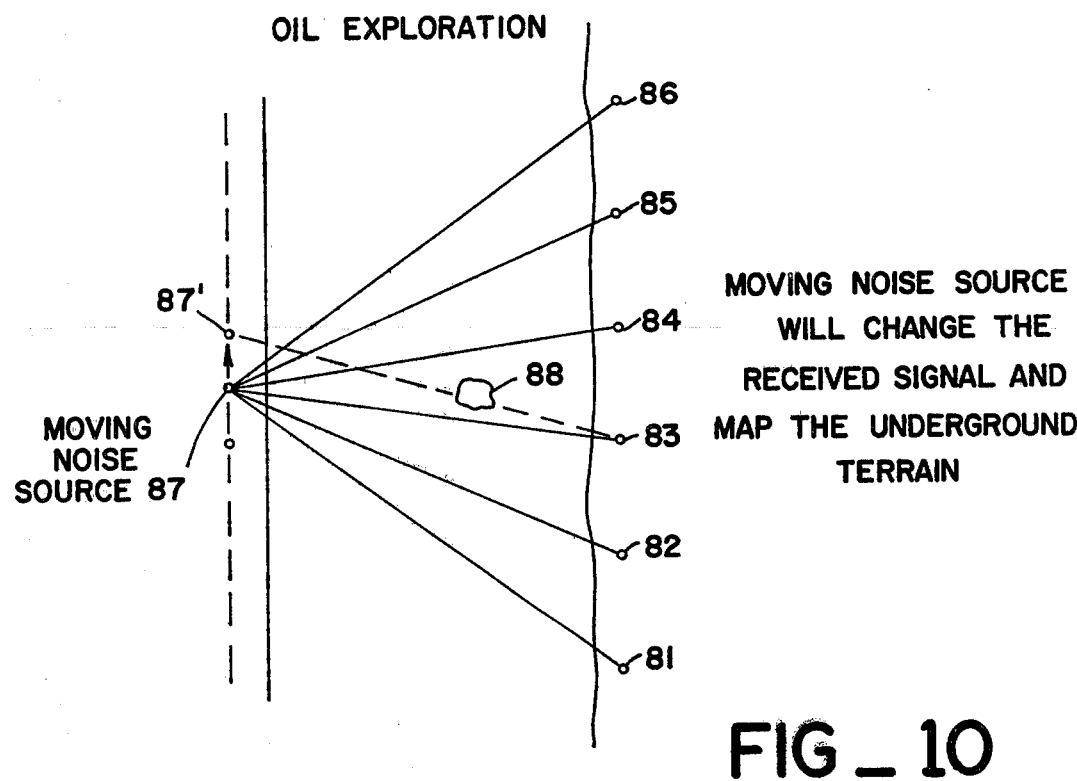
FIG_10
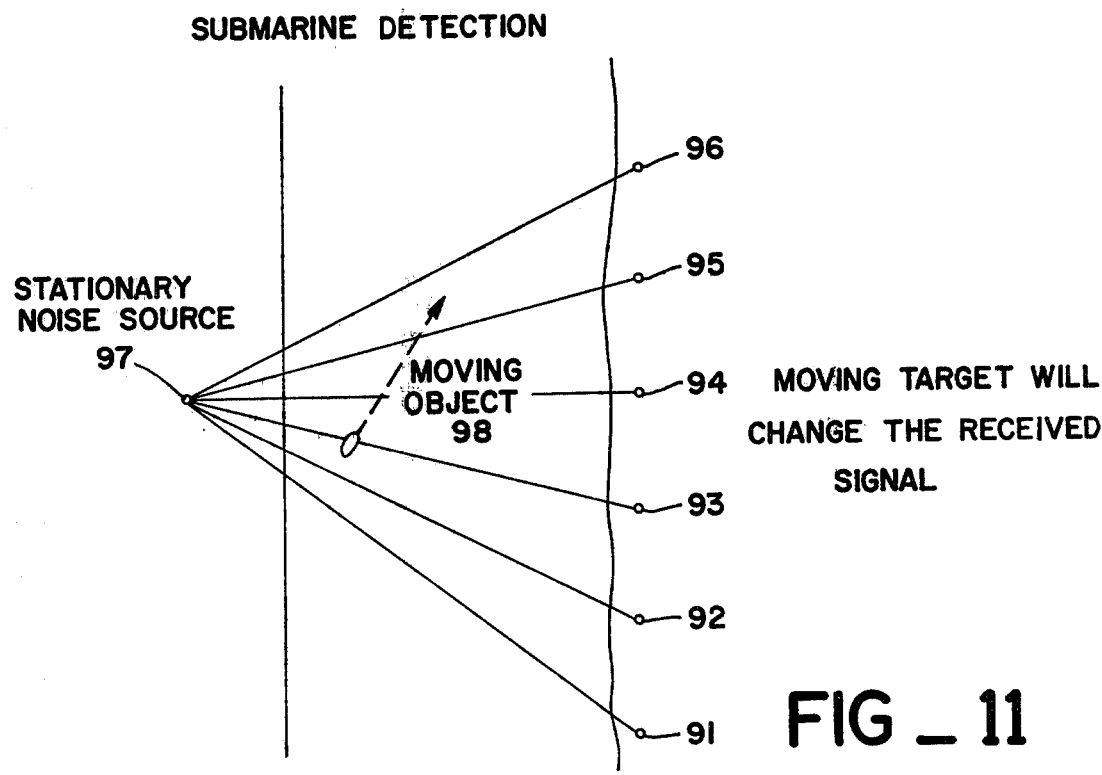
FIG_11

LOW FREQUENCY DETECTION SYSTEM

BACKGROUND OF THE INVENTION

1. Field of the Invention

The present invention relates to a low frequency detection system and more particularly to a low frequency detection system that employs the sound radiating characteristics of sloping underwater near shore terrain.

2. Description of the Prior Art

A major problem confronted by acoustic experts today is that of providing effective low frequency underwater sound detection techniques. It is known that low frequency acoustic signals travel much further underwater than high frequency signals. For example, it is known that signals in the 1 to 10 Hz range will travel in water for more than a thousand miles. However, adequate detection techniques of these signals have not been developed. In addition, considerable difficulty has been encountered in providing ocean located low frequency acoustic detection systems that are secure from tampering by ocean going vehicles or personnel. The present invention overcomes this problem by making it possible to provide a sensitive and yet hardened system that can detect these underwater low frequency acoustic signals.

SUMMARY OF THE INVENTION

Briefly, the present invention comprises a low frequency detection system including the use of the sloping characteristics of the underwater near shore, the tapered section of ocean above the near shore, and an acoustic array. The acoustic array comprises a plurality of detectors that extend into the earth and are near the shore and tapered media. Low frequency sound energy in the range of from about 1 to about 100 Hz is coupled into the earth at discrete positions in the form of well defined beams along the interface between the ocean and the sloping underwater shore. The maximum energy density for each frequency occurs at different ocean depths and the acoustic detectors are positioned to receive the optimum earth radiated beam at selected frequencies. The system involves locating tuned elements of an array in different arrangements and using a plurality of arrays and moving or stationary sound sources for active target detection and underwater earth mapping.

STATEMENT OF THE OBJECTS OF THE INVENTION

An object of the present invention is to provide a low frequency detection system;

Another object of the present invention is to provide a low frequency detection system that is capable of detecting ocean sound waves in the frequency range of from about 1 to 100 Hz;

Still another object of the present invention is to provide a low frequency acoustic detection system that utilizes the sloping characteristics of the underwater near shore;

A further object of the present invention is to provide a low frequency detection system that has earth located detectors for detecting energy radiated into the earth by propagating ocean sound waves;

Another object of the present invention is to provide a passive low frequency detection system that utilizes the sloping characteristic of the underwater near shore and employs earth located detectors that are secure from tampering by ocean going vehicles or personnel;

Still another object of the present invention is to provide an active low frequency detection system that utilizes the sloping characteristics of the underwater near shore and is capable of active underwater target detection using transducers in the earth;

A still further object of the present invention is to provide an active low frequency detection system that utilizes the sloping characteristics of the underwater near shore and is capable of underwater earth mapping using transducers in the earth;

Other objects, advantages and novel features of the invention will become apparent from the following detailed description of the invention when considered in conjunction with the accompanying drawings wherein:

BRIEF DESCRIPTION OF THE DRAWINGS

FIG. 1 is a diagram showing the normal propagating modes in a hard boundary or containing wave guide;

FIG. 2 is a diagram showing the normal propagating modes in a semi-containing boundary;

FIG. 3 is a diagram showing a typical ocean sound velocity profile;

FIG. 4 is a diagram of the phase and group velocity for a liquid over liquid waveguide;

FIG. 5 is a diagram of the phase and group velocity for a liquid over solid waveguide;

FIG. 6 is one embodiment of the low frequency detection system of the present invention;

FIG. 7 is another embodiment of the low frequency detection system of the present invention;

FIG. 8 is still another embodiment of the low frequency detection system of the present invention;

FIG. 9 is still another embodiment of the low frequency detection system of the present invention;

FIG. 10 is an embodiment of the present invention which is suitable for geophysical mapping and uses the detection arrays shown in FIGS. 6 through 9; and FIG. 11 is an embodiment of the present invention which is suitable for the active detection of a moving underwater target and uses the detection arrays shown in FIGS. 6 through 9.

DESCRIPTION OF THE PREFERRED EMBODIMENT

In accordance with the low frequency detection system of the present invention there is a coupling of the propagating low frequency acoustic energy in the ocean across the tapered shore boundaries into earth wave radiation modes. The system involves the use of the sloping characteristics of the underwater near shore, such as the continental shelf, the ocean, and a land located acoustic detection system. In this region the ocean forms a tapered media between the ocean surface and the underwater earth making up the sloping ocean floor. The detection system involves a plurality of acoustic detectors forming a detector array that is positioned in an elongated opening that extends into the earth and is near the shore and tapered media. Sound energy in the tapered media (ocean) is coupled into the earth at discrete positions along the interface between the ocean and the sloping underwater shore. The maximum energy density for each frequency occurs at different ocean depths and the acoustic detectors are positioned to receive the optimum earth radiated beam (having a particular depression angle) at predetermined selected frequencies.

Before considering the specific structure of the low frequency detection system of the present invention it is desirable to consider some applicable concepts of wave guide theory. At the outset it should be noted that under the simplest conditions (a hard boundary wave guide) that waves of different frequencies (whether electromagnetic or acoustic) will propagate in the wave guide as discrete normal modes such as illustrated in FIG. 1. However, when these same waves propagate in a non-ideal wave guide, such as where there are several regions with different propagation velocities, then the boundary is semi-defined and the normal modes of the waves will not be completely contained with the boundary as shown in FIG. 2.

FIG. 3 shows the modal behavior of a liquid guide over a liquid substrate. Group and phase velocity curves are shown to illustrate waveguide behavior near cutoff at each mode. As the waveguide thickness, t, decreases, the second mode approaches cutoff. In this example the phase and group velocities approach $1.5 \alpha_1$, the velocity of propagation in the substrate region. The energy in this cutoff mode is radiated and also coupled into the first mode. A further decrease of t causes the first mode to cut off, and, because no lower order modes are propagating, most of its energy is radiated into the substrate. This example is considerably simpler than the liquid-over-solid case of an actual ocean-earth coupling situation.

FIG. 4 shows phase and group velocity curves for a liquid-over-solid waveguide. The second mode shows essentially the same features described in FIG. 3 and can be expected to couple energy into the lowest order mode as it cuts off. The first mode, however, has considerably different cutoff characteristics. As the thickness of the waveguide approaches zero, energy in this mode is seen to be propagating at about $2.7 \alpha_1$, the Rayleigh wave velocity for this choice of materials. This indicates that, for a wedge-shaped structure—i.e., the non-planar waveguide encountered at a beach—energy will be distributed from the first-order mode into a radiated wave, a Rayleigh wave which is bound to the earth-air interface, and, depending on the slope of the beach, reflected waves within the wave guide. If the beach slope is small, most of the higher order mode energy will be coupled into the lowest order mode, which will subsequently radiate a well-defined beam into the solid substrate.

For a 10 Hz sound source with the velocity of propagation in the sea taken to be 1500 m/s, the lowest order mode will radiate at somewhat less than a depth of 150 meters, and an additional higher order mode will be able to propagate for each additional 75 meters of depth available. This indicates that slowly tapering beaches will be most useful for this earth acoustic coupling scheme, since it is advantageous to keep the radiation coupling region far enough out to sea to avoid excessive surf noise.

It should be noted that this system works very well for the ultralow frequency of say 1 to 10 Hz because of the ocean depth where conversion occurs for these frequencies. However, shore noise (wave action near shore or noise from industrial activity) may be a factor in some locations and therefore, the wave action would tend to obscure the signal at the higher frequencies. However, the ultralow frequencies are of great interest, especially for long range detection, since a 5 Hz signal, for example, will propagate in water for thousands of miles. It also should be noted that the earth radiating angle is defined as the depression angle $\theta$ and may be from about 10 to 15 degrees from horizontal. In addition, the radiating signal is quite directional but may still have a beam width of a few degrees.

In FIG. 6 is illustrated one embodiment of the present invention. In this embodiment and subsequent figures the earth array could be used as a sound source as well as a sound detector. A plurality of tuned filters 11, 13, 15 and 17 are mounted in an elongated cavity 19 that is drilled into the earth at an angle $\beta$. The angle $\beta$ is selected to be normal to the radiated signals $S_1$, $S_2$, $S_3$, and $S_4$ which are operating at the respective frequencies $f_1$, $f_2$, $f_3$, and $f_4$. The filters 13, 15, 17 and 19 are respectively tuned to the frequencies $f_1$, $f_2$, $f_3$, and $f_4$ and are positioned to be in the path of the particular signal containing that frequency.

As previously explained this comprises a low frequency detection system since there is a coupling into the sloping underwater shore 25 of the propagating low frequency acoustic signal 21, emanating from a noise source 23, in the tapered ocean region 27 that is between the ocean surface 29 and ocean bed or underwater shore 25. Sound energy in the tapered media (ocean) is coupled into the underwater shore at discrete positions as previously explained with respect to FIGS. 1 through 5. The maximum energy density for each frequency occurs and is radiated by the underwater shore 25 at different ocean depths, as previously explained, and the acoustic detectors are positioned to receive this radiation as illustrated. From this it can be seen that a low frequency (1 to 100 Hz) detection system is provided that is capable of detecting a low frequency sound source that may be hundreds and even thousands of miles from shore. In addition, the detectors are completely secure from tampering by ocean going vehicles or personnel.

In FIG. 7 is illustrated another embodiment of the present invention. In this embodiment the tuned detectors 31, 33, 35 and 37 are positioned in a vertical shaft 39 and in a position where they receive the reflected signal to which they are respectively tuned. This embodiment may be useful where only vertical shafts are available and the propagating signals $S_1$, $S_2$, $S_3$ and $S_4$ are of sufficient strength.

In FIG. 8 is illustrated another embodiment of the present invention. In this embodiment the tuned detectors 41, 43, 45 and 47 are positioned in shafts 49, 51, 53 and 55 respectively. These shafts and detectors are positioned under the surface of the tapered body of water and the particular tuned detector is positioned to receive the radiated signals $S_1$, $S_2$, $S_3$ and $S_4$ to which it is tuned. In this embodiment the cables 57 must be laid along the ocean floor for transmission of the received signals to land for processing. This system may be very useful where either the depression angle is large or the slope angle of the continental shelf is small. This embodiment has a disadvantage with respect to the previously described embodiments where security is a factor in that cable 57 is exposed to tampering by ocean going vehicles or personnel.

In FIG. 9 is illustrated still another embodiment of the present invention. In this embodiment trenches 61 and 63 or elevated obstacles 65, 67 are positioned at the location of the radiated frequencies of interest. These trenches and obstacles have the effect of decreasing the depression angle from $\theta$ to $\theta_1$ as illustrated. This makes it possible to position detectors 71, 73, 75 and 77 at more shallow depths than if no trenches or obstacles were used.

In FIG. 10 is shown another embodiment of the present invention. In this embodiment a plurality of detection stations 81, 82, 83, 84, 85 and 86 are positioned along the shore of a body of land. Each of these stations are of the type described in the previous embodiments. A noise source 87, having a frequency range of from 1 to 100 Hz, is moved in the ocean in a path generally denoted by the dotted line. The noise source may be off shore several hundred or a thousand or more miles. By moving the noise source there will be a change in the received noise signal when the transmitted signal passes through or is impeded by an unusual underground characteristic such as a change in rock formations or an off shore oil deposit. For example, the signal detected by station 83 will vary, due to deposit 88, when the noise source moves from position 87 to position 87′.

In FIG. 11 is shown still another embodiment of the present invention. In this embodiment a plurality of detection stations 91, 92, 93, 94, 95 and 96 are positioned along the shore of a body of land. Each of these stations is of the type described in the previous embodiments. A stationary noise source 97, having a frequency range of from 1 to 100 Hz, is positioned in the ocean at a distance of several hundred to a thousand or more miles. Therefore, a moving target 98, such as a submarine, will cause a change in the signal received by the stations, such as station 98, whose received signal has been changed by the moving target.

What is claimed is:

1. The method of detecting low frequency sound in the range of from about 1 to about 100 Hz propagating in the ocean including the use of the earth, the sloping characteristic of the earth's underwater near shore, the tapered section of ocean above the near shore comprising the steps of:
   (a) the sloping earth's underwater near shore coupling with the ocean and radiating beams of energy into the earth from predetermined positions, in predetermined directions and at discrete frequencies; and
   (b) detecting said beams by a plurality of detectors tuned to said discrete frequencies and positioned in the earth at locations that are in the path of said radiating beams of energy.

2. A low frequency detection system for detecting low frequency sound in the range of about 1 to about 100 Hz propagating in the ocean including the use of the earth, the sloping characteristics of the earth's underwater near shore, the tapered section of ocean above the near shore comprising:
   (a) an acoustic array including a plurality of detectors tuned to discrete frequencies; and
   (b) each of said detectors being positioned in the earth to receive sound energy radiated by said underwater near shore; whereby
   (c) the sloping earth's underwater near shore couples with the ocean and radiates beams of energy from predetermined positions, in predetermined directions and at discrete frequencies to be respectively received by said plurality of detectors tuned to said discrete frequencies.

3. The system of claim 2 including:
   (a) an elongated opening drilled into the earth in a direction that is about normal to the direction of the sound energy radiated by said underwater near shore; and
   (b) said array positioned in said opening.

4. The system of claim 2 including:
   (a) an elongated opening drilled into the earth in a direction about perpendicular to the earth's surface; and
   (b) said array positioned in said opening.

5. The system of claim 2, including:
   (a) a plurality of openings drilled in the earth in the underwater near shore; and
   (b) said detectors respectively positioned in said plurality of openings.

6. A low frequency detection system for detecting low frequency sound in the range of from about 1 to about 100 Hz propagating in the ocean including the use of the earth, the sloping characteristics of the earth's underwater near shore, the tapered section of ocean above the near shore comprising:
   (a) a plurality of acoustic arrays each of which includes a plurality of detectors tuned to discrete frequencies;
   (b) each of said detectors being positioned to receive sound energy radiated by said underwater near shore;
   (c) said plurality of acoustic arrays being spaced apart at predetermined positions along the shore;
   (d) a sound source emitting sound in the frequency range of from about 1 to about 100 Hz; and
   (e) said sound source being positioned in the ocean for being received by said plurality of arrays.

7. The system of claim 6 wherein:
   (a) said sound source is stationary.

8. The system of claim 6 wherein:
   (a) said sound source is moving.

* * * * *